United States Patent [19]
Caputo

[11] Patent Number: 5,746,815
[45] Date of Patent: May 5, 1998

[54] STABLE OIL-IN-WATER INK EMULSIONS BASED UPON WATER-REDUCIBLE NIGROSINE DYES FOR INK-JET PRINTERS AND FELT-TIP AND ROLLER-BALL PENS

[75] Inventor: Peter A. Caputo, South Orange, N.J.

[73] Assignee: Morton International, Inc., Chicago, Ill.

[21] Appl. No.: 688,921

[22] Filed: Jul. 31, 1996

[51] Int. Cl.$^6$ .................................................. C09D 11/02
[52] U.S. Cl. ................... 106/31.25; 106/31.26; 106/31.47
[58] Field of Search ........................... 106/31.25, 31.26, 106/31.47

[56] References Cited

U.S. PATENT DOCUMENTS

| | | | |
|---|---|---|---|
| 3,951,598 | 4/1976 | Arashi et al. | 8/169 |
| 5,226,957 | 7/1993 | Wickramanayake et al. | 106/31.26 |
| 5,336,553 | 8/1994 | Tanaka et al. | 428/229 |
| 5,342,440 | 8/1994 | Wickramanayake | 106/31.43 |
| 5,492,559 | 2/1996 | Oliver et al. | 106/31.25 |
| 5,500,023 | 3/1996 | Koike et al. | 8/499 |
| 5,643,357 | 7/1997 | Breton et al. | 106/31.25 |

FOREIGN PATENT DOCUMENTS

| | | |
|---|---|---|
| 0625552 | 11/1994 | European Pat. Off. . |
| 2627471 | 1/1977 | Germany . |
| 62-244370 | 10/1987 | Japan . |

*Primary Examiner*—Helene Klemanski
*Attorney, Agent, or Firm*—Steven C. Benjamin; Gerald K. White

[57] ABSTRACT

A highly fluid water-based ink composition that comprises a stable oil-in-water emulsion of a water-reducible, water-insoluble nigrosine dye-containing solvent solution, preferably containing a high flash-point and high-boiling point solvent, homogeneously dispersed as small, finely divided dye-containing oil droplets in an aqueous carrier solution containing an emulsion stabilizer of a water-soluble resin. Water-insoluble nigrosine dyes are dissolved preferably in relatively low VOC and non-flammable solvent solutions containing non-ionic surfactants to form emulsifiable water-reducible true nigrosine dye-containing solutions. The water-reducible nigrosine dye-containing solutions are then stably emulsified as dye-containing oil droplets in aqueous solutions that contain water, optional solvent diluents, and water-soluble resins that serves as an emulsion stabilizer. The stable oil-in-water ink emulsion is suitable to be ejected through small ink-jet printer nozzles, or through dispensing tips of felt-tip or roller-ball pens, onto a porous substrate, such as paper, to construct a water-fast printed image on the substrate.

18 Claims, No Drawings

5,746,815

1

STABLE OIL-IN-WATER INK EMULSIONS BASED UPON WATER-REDUCIBLE NIGROSINE DYES FOR INK-JET PRINTERS AND FELT-TIP AND ROLLER-BALL PENS

FIELD OF THE INVENTION

The present invention relates to the field of ink compositions, and more particularly to the field of ink compositions useful for ink-jet printing and felt-tip and roller-ball writing. Even more particularly, the present invention relates to aqueous ink compositions that are stable and fluid oil-in-water ink emulsions including finely divided water-reducible, water-insoluble nigrosine dye-containing oil droplets uniformly dispersed in an aqueous stabilizing medium, and to a method of forming indicia on a substrate by ink-jet printing or felt-tip and roller-ball writing using such stable aqueous ink emulsions.

BACKGROUND OF THE INVENTION

Recently, ink-jet printing has taken on greater significance due to the introduction of the personal computer. Most personal computers are attached to ink-jet printers which print readable images stored in the computer memory in a digitized form onto a paper substrate. Ink-jet printing provides a non-contact, pressureless form of printing onto a substrate that has the advantage of including all the information on a printed page in the computer memory without the need for a printing plate.

There are two different types of ink-jet printing processes, continuous and direct ink-jet printing. In continuous ink-jet printing, the principle of operation involves ejecting the ink through a jet nozzle under pressure at very high speeds to form a jet stream, breaking up the jet stream by vibrations to form uniform droplets, some of which will be charged electrostatically, and then deflecting electrostatically charged droplets into a catcher and recirculating them into the ink reservoir, as the remaining uncharged droplets continue in flight to form dots on the printing substrate to construct images. In direct ink-jet printing, commonly referred to as drop-on-demand, the principle of operation involves ejecting the ink under pressure and/or thermal excitement at very high speeds through a small jet nozzle to form uniform droplets which directly impinge on the printing substrate without the creation of an electrostatic field. This way, all ink expelled must go onto the substrate. Most computer printers use drop-on-demand technology which does not involve the use of conductive inks. The present invention generally provides in one aspect non-conductive inks for drop-on-demand ink jet printing operations.

Inks formulated for ink-jet printing must be very fluid, stable, and free of any particles that could cause clogging of the jet nozzles. Also, these inks must be capable of depositing and adhering to the printing substrate with a minimum of character blurring, must be fast drying, and should be permanent with respect to exposure to water. This is also true for inks used in felt-tip and roller-ball writing instruments. A variety of ink formulations have been proposed but have a number of shortcomings.

Ink-jet printing inks as well as inks for writing instruments are generally formulated with soluble dye colorants in a compatible aqueous or solvent-based vehicle to form very fluid, particle-free, dye solutions. Non-aqueous inks have been proposed that contain water-fast, water-insoluble solvent dyes dissolved in volatile organic solvent-based carriers. The use of water-insoluble solvent dyes, especially for ink-jet printing is advantageous, since the solvent dyes have

2 reasonable solubility in volatile organic solvents and, therefore, can be applied as true liquid solutions free of any particles. Another benefit of using solvent dyes in inks is that they tend to be permanent, at least with respect to exposure to water. But one major drawback in their use is that the solvent dyes usually require high amounts of volatile organic solvent carriers, such as xylene, to uniformly dissolve the dyes and provide the primary carrier for the ink.

High amounts of volatile solvents in ink formulations are problematic from both health and environmental standpoints. There is an increasing demand in the printing industry to reduce the amount of volatile organic compounds ("VOC"s) in inks in general. One approach has been to try to formulate water-based inks, such as ink-jet printing inks and inks for writing instruments, without volatile organic solvent carriers. Aqueous inks have been proposed that contain water-soluble dyes. However, the use of water-soluble dyes in inks usually provides an inferior product, since the water-soluble dyes lack water resistance and, accordingly, the printed image has a tendency to bleed when wetted.

Furthermore, aqueous ink formulations, in the past, have tended to exclude the use of water-immiscible solvent dyes because of their general inability to form stable dispersions in water. The water-immiscible solvent dyes are hydrophobes and when mixed with water tend to separate or precipitate out of an aqueous mixture. This generally results in the formation of unstable, non-homogeneous, dispersions containing unacceptably large dye particles that can cause clogging in ink-jet printer nozzles as well as in felt-tip and roller-ball pens. Moreover, the agglomerated particles tend form streaks, blots, or other print imperfections on the printed substrate. It would be desirable to formulate aqueous inks containing water-immiscible solvent dyes in order to take advantage of their excellent water-fastness without the accompanying drawbacks of containing harmful volatile organic solvents and forming unstable dispersions.

Nigrosine dyes, in particular, are a well-known class of black solvent dyes. The present invention concerns the use of solvent-soluble nigrosine dyes that are insoluble in water. Although there are water-soluble nigrosines, particularly sulfonated nigrosines, the invention is not directed to the use these nigrosines. Water-soluble nigrosine, when used to dye a material, remain water-soluble and therefore can be washed away. On the other hand, it would be desirable to use inks made from water-insoluble nigrosine dyes that are nevertheless reducible in water or aqueous solutions. In the past, ink solutions containing water-insoluble nigrosines have typically utilized organic solvent, such as an alcohol, as the carrier. Even then, these solvent solutions of nigrosine dyes tend to be unstable, and fatty acids are commonly used as co-solvents for nigrosine-in-solvent solutions.

U.S. patent application Ser. No. 08/629,127 filed Apr. 4, 1996, which is incorporated by reference herein in its entirety, discloses a new class of concentrated water-reducible, water-insoluble nigrosine dye-containing compositions that are claimed to be infinitely dispersible in water as oil-in-water emulsions. In providing such water-reducible liquid nigrosine dye-containing solutions, it was desired that the nigrosine concentration be high, preferably having nigrosine concentrations of 20 wt. % or greater, so that the nigrosine provides a meaningful level of color even when reduced with substantial amounts of water. Furthermore, for safety reasons, it was preferred that the carrier be non-flammable, i.e., have a flashpoint of at least about 141° F. (61° C.). Also, it was desired that VOC's be kept low both for environmental reasons and to minimize odor, i.e., have a boiling point of the organic solvent of at least about 280° F. (138° C.).

Exemplary water-reducible nigrosine dye-containing solutions of U.S. Ser. No. 08/629,127 include: between about 20 and about 50 wt. % of a) a water-insoluble nigrosine dye; between about 25 and about 40 wt. % of b) a solvent having a flashpoint of at least about 141° F. (61° C.) and a boiling point of at least about 280° F. (138° C.); and, between about 20 and about 40 wt. % of c) a non-ionic surfactant, the weight percentages being based on total weight of a), b), and c). The water-reducible nigrosine dye-containing solution is prepared by initially dissolving the nigrosine dye a) in a $C_1$–$C_3$ alkanol to provide an alcohol solution. The alcohol solution is then mixed with the organic solvent b) and the non-ionic surfactant c). Subsequently, the $C_1$–$C_3$ alkanol is stripped.

The water-reducible form now offers the potential for use of water-insoluble nigrosine dyes in water-based ink systems with the advantage of being fast to water and without the accompanying disadvantages of containing substantial amounts of harmful volatile organic solvent carriers. However, in practice, problems have arisen in the use of such water-reducible nigrosine dyes in water-based ink formulations.

Although U.S. Ser. No. 08/629,127 suggests a number of possible uses for the oil-in-water ink emulsions, for instance, inks for writing instruments and printing inks, those inks prepared from the water-reducible nigrosine dye-containing solutions according to its teachings have not been able to perform as good as expected in the field. Upon mixing with water alone, the water-reducible nigrosine dye-containing solutions are said to form oil-in-water emulsions. One problem, however, is that the ink emulsions produced thereby are relatively unstable. Consequently, in a relatively short period of time after mixing, the dispersed nigrosine dye-containing oil droplets tend to settle to the bottom of the aqueous mixture, thereby destroying the uniformity of the emulsions. The stratification of the dye droplets requires the ink user to agitate the relatively unstable ink prior to and during use in order to ensure proper emulsification, which is undesirable from a product quality as well as extra time and cost standpoint. Moreover, if the ink has not been adequately reemulsified prior to use, the clumped together solvent dye droplets can cause clogging in ink jet nozzles or in roller-ball rollers and felt-tips of pens. Also, the agglomerated dye droplets can streak, blot, and otherwise mar the quality of the printed indicia on the printing substrate. Substantial efforts are still required in order to provide relatively stable and fluid oil-in-water ink emulsions based on the water-reducible form of water-insoluble nigrosine dyes.

What is needed is a fluid aqueous ink emulsion based on water-reducible, water-insoluble nigrosine dyes, for use in ink-jet printers and felt-tip and roller-ball writing instruments, that exhibits much improved emulsion stability.

SUMMARY OF THE INVENTION

It is an object of the present invention, therefore, to provide a stable aqueous ink composition containing a water-reducible, water-insoluble nigrosine dye for use in ink-jet printers or in felt-tip and roller-ball pens without having the aforesaid disadvantages.

It is another object of the present invention to provide a stable aqueous ink emulsion containing a water-reducible, water-insoluble nigrosine dye without the use of substantial amounts of harmful organic solvent carriers.

It is still another object of the present invention to provide a stable aqueous ink emulsion containing a water-reducible, water-insoluble nigrosine dye, that is fast to water when dried.

It is yet another object of the present invention to provide a stable aqueous ink emulsion of a water-reducible, water-insoluble nigrosine dye-containing solution made with a low VOC solvent.

It is yet another object of the present invention to provide a stable oil-in-water ink emulsion of a very fluid nature containing relatively finely divided and uniformly suspended water-reducible, water-insoluble nigrosine dye-containing oil droplets in an aqueous stabilizing medium.

And still another object of the present invention is to provide an aqueous ink composition usable in ink-jet printers, or a writing instrument ink composition usable in felt-tip and roller-ball pens, that comprises a highly fluid, stable oil-in-water emulsion of a water-reducible, water-insoluble nigrosine solvent dye-containing low VOC solvent solution that is stably emulsified in an aqueous medium containing a water-soluble resin stabilizer, and also that is substantially free of larger solvent dye particle droplets or flocculated droplets that can cause clogging of jet nozzles in ink-jet printers or in dispensing tips of felt-tip and roller-ball pens as well as streaking and blotting on the printed substrate.

It is yet another object of the present invention to provide a method for forming indicia on a substrate by ink-jet printing or felt-tip and roller-ball writing using the aforesaid highly fluid, stable aqueous ink emulsions containing water-reducible, water-insoluble nigrosine dyes.

These and other objects, features, and advantages of the invention will become apparent from the following description and appended claims.

The present invention provides a stable oil-in-water ink emulsion that is characterized by preferably having: 1) between about 1 and about 30 wt. % of a water-reducible nigrosine dye-containing solution that includes: a) between about 20 and about 50 wt. % of at least one water-insoluble nigrosine dye, b) between about 25 and about 50 wt. % of at least one solvent having a flashpoint of at least about 141° F. (61° C.) and a boiling point of at least about 280° F. (138° C.), and c) between about 20 and about 40 wt. % of a non-ionic surfactant; 2) between about 25 and about 90 wt. % of water; 3) between about 0 and about 30 wt. % of at least one additional solvent; and, 4) between about 0.1 and about 45 wt. % of at least one water-soluble resin to maintain the stability of the emulsion, in which component 1) is stably dispersed and emulsified by suitable agitation in components 2–4), to form a relatively stable, fluid oil-in-water ink emulsions of finely divided and uniformly dispersed nigrosine solvent dye-containing oil droplets in a stabilizing aqueous medium for use in ink-jet printers and felt-tip and roller-ball pens.

The present invention also provides a method for creating indicia on a paper substrate using the aforesaid stable fluid oil-in-water ink emulsions characterized by the step of ejecting the ink emulsions either the ink emulsions either through the ink-jet nozzles of ink-jet printers or the dispensing tips of felt-tip and roller-ball pens.

DETAILED DESCRIPTION OF THE PREFERRED EMBODIMENTS OF THE INVENTION

The present invention now provides novel aqueous printing and writing ink compositions that comprise stable emulsions, preferably of the oil-in-water type, of water-immiscible nigrosine dye-containing solutions, preferably containing a high flash point and high boiling point solvent, that are infinitely reducible in water and are now able to be stably and uniformly dispersed as finely divided dye-containing oil droplets in aqueous medium for an extended time. The formation of stable aqueous ink emulsions of the water-reducible nigrosine dye-containing solutions eliminates the need for substantial amounts of harmful solvent carriers normally used in conjunction with water-insoluble nigrosine dyes. Also, the use of high flash point and high boiling point solvents in the nigrosine dye-containing solutions further reduces the amount of harmful solvents that must be present in the ink emulsions of the invention.

The present invention further provides aqueous ink compositions that are highly fluid and are essentially free of larger dye droplet particles or flocculated dye droplet particles that can clog jet nozzles of ink jet printers as well as the dispensing tips of felt-tip and roller-ball pens. Also, when dried, the aqueous ink emulsions are permanent with respect to exposure to water but resoluble with respect to its own solvent carriers to prevent caking of the ink in the jet nozzles between intermittent spurts of ink jets or in the dispensing tips of the felt-tip and roller-ball pens between usages. The ink emulsions are further capable of depositing and adhering to the printing substrate with a minimum of character fogging or bleeding, and are fast drying without streaking and blotting on the substrate.

The first component included in the stable ink emulsion of the present invention is 1) a water-reducible, water-insoluble nigrosine dye solution of the kind taught in U.S. Ser. No. 08/629,127, previously incorporated, or having a composition similar thereto. In particular, the water-reducible nigrosine dye-containing solution 1) includes a mixture of: a) between about 20 and about 50 wt. % of a water-insoluble nigrosine dye, b) between about 25 and about 40 wt. %, and even up to 50 wt. %, of a solvent having a flashpoint of at least about 141° F. (61° C.) and a boiling point of at least about 280° F. (138° C.), and c) between about and about 40 wt. % of a non-ionic surfactant, the weight percentages being based on total weight of a), b), and c). The aforesaid ranges are merely exemplary and other ranges will become apparent from the practice of the invention.

By water-insoluble nigrosine dye it is meant herein a nigrosine dye having a solubility in water at 25° C. less than about 0.1 g/100 ml. Nigrosine dyes a) useful in the dye-containing solution 1) are obtained by heating nitro compounds, such as nitrobenzene or nitrophenols, with aniline and aniline hydrochloride in the presence of iron or ferric chloride. Different grades (types) of nigrosine can readily be prepared by altering the proportions of reactants and time of heating. The nigrosine compositions thus prepared are cocktails of compounds which, in its simplest form can be shown as:

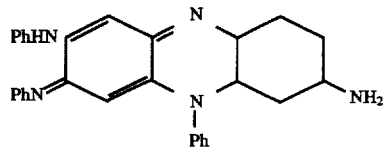

This can be said about C.I. Solvent Black 5 and the free base of C.I. Solvent Black 7 hydrochloride structure shown below:

C.I. Solvent Black 5:

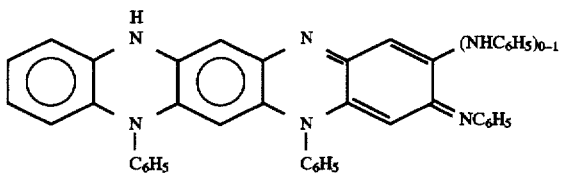

C.I. Black 7 Spirit Soluble:

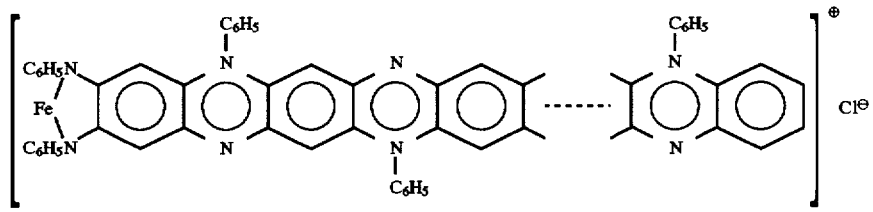

The nigrosine base is prepared by reaction of nigrosine compositions with mild alkalis, resulting in rearrangement.

High flash point and high boiling point organic solvents b) useful in the dye-containing solution 1) include, but are not limited to: diethylene glycol, triethylene glycol, tetraethylene glycol, propylene glycol, n-methyl-2-pyrrolidinone (m-pyrol), butyl lactate, and mixtures thereof. Suitable non-ionic surfactants c) useful in the dye-containing solution 1) include, without limitation: fatty acid esters, polyoxyethylated nonyl phenol derivatives, Rhone Poulenc-Igepal® CO-720 and CO-630 nonylphenoxypoly(ethyleneoxy) ethanol CAS #9016-45-9, Union Carbide-Tergitol® D-683 alkoxylated alkylphenol CAS#37251-69-7, Rhone Poulenc-Alkamide® 2106 modified coconut diethanolamide CAS #68603-42-9, Rhone Poulenc-Alkamuls® EL-985 polyethoxylated caster oil CAS #75-21-8, and Morton International-Soltex® N long chain fatty acid esters, CAS#N.E, or the like.

Water-insoluble nigrosine dyes do not dissolve directly in the high-flashpoint, high-boiling solvents b), described above, to the high concentrations described and claimed herein. Accordingly, in accordance with the present invention, the nigrosine is first dissolved in the $C_1$-$C_3$ alkanol, preferably n-propanol to provide an alcohol solution. The concentration of nigrosine in the alcohol solution is preferably high, e.g., preferably at least about 20 wt %, so as to assure proper pre-dissolving of the nigrosine and to minimize the amount of alkanol which is to be stripped at a later stage. While nigrosines dissolve in low molecular weight alkanols, alkanols are undesirable from the standpoint of VOCs and flammability. Also, to reduce the waste stream generated by this process, the alkanol can be isolated and re-used for subsequent production batches of this invention.

The nigrosine-in-alkanol solution is then added to the high-flashpoint, high-boiling organic solvent b) and the non-ionic surfactant c). Preferably, addition is to the solvent b) first, then the surfactant c), although, addition to a mixture of solvent b) and surfactant c) is possible. Addition of the nigrosine-in-alkanol solution to b) and c), either successively or as a mixture of b) and c), is done slowly with agitation to prevent precipitation of the nigrosine. Likewise, components b) and c) can be added together (as a premix) or separately, directly to the nigrosine-in-alkanol solution. To reduce flashpoint and solubility, the alkanol is then stripped at elevated temperatures and/or reduced pressure.

While the nigrosine-dye containing solutions described utilize a high-flashpoint, high-boiling solvent, a user of these solutions who has less concern for either flashpoint or VOCs, perhaps because of the particular use environment or low level of use, may add a compatible solvent, for example, methyl lactate, or even a lower alkanol, for instance, propanol, or the like, all with lower flashpoints and/or boiling points.

The nigrosine dye-containing compositions 1) are infinitely dispersible in water or aqueous solutions. When added to water or aqueous solutions with agitation, the compositions are dispersed as an oil-in-water emulsion.

The true nigrosine dye-containing solution 1) is typically provided free of water for shipment and storage. The end user will take the concentrated dye solution and add it to water to produce an aqueous dispersion of the dye solution. However, until the present invention, it has not been possible in practice to create sufficiently stable aqueous ink dispersions usable in ink-jet printers and felt-tip and roller-ball writing instruments. The current inventor realized that the nigrosine dye-containing droplets tended to rapidly settle out and agglomerate in water, which is undesirable for ink formulations. Therefore, the present invention now includes an aqueous stabilizing medium for the water-reducible nigrosine dye-containing solutions that is used to adequately create and maintain finely divided nigrosine dye-containing oil droplets stably and uniformly in an oil-in-water ink emulsion. The components recited hereinafter produce the stable oil-in-water emulsions of the present invention.

The next component that is included in the stable ink emulsion of the present invention is 2) water to effect emulsification of the dye solution. In the present invention, the aqueous ink emulsion that is formed is most preferably a very fluid oil-in-water emulsion of uniformly dispersed and finely divided water-insoluble nigrosine dye-containing oil droplets. The term "oil-in-water emulsion" refers to an emulsion system in which water-reducible nigrosine dye-containing oil droplets are dispersed in a continuous aqueous phase. The mere presence of water, however, as previously discussed, is not enough to form a stable oil-in-water emulsion of the dye droplets having the desired properties for ink-jet printing and felt-tip and roller-ball writing applications. Accordingly, other components must be included such that the aqueous ink emulsion containing the water-insoluble nigrosine dye has properties similar to inks composed of homogeneous, particle-free, dye solutions normally used for such applications.

Another component that may be included in the stable ink emulsion of the present invention is 3) a compatible organic co-solvent. The water-miscible organic solvent serves as a diluent. Examples of suitable organic co-solvents include, without limitation, methanol, ethanol, n-propanol, triethanolamine, methyl lactate, ethyl lactate, methyl ethyl ketone, xylene, 1-methoxy-2-propanol, 2-methoxy-1-propanol. Other solvents, including those previously disclosed herein, can also be used so long as they are compatible with the water-soluble resin component described hereinafter. Care must be taken not to use too much co-solvent which may invert the emulsion.

The next component that is included in the stable ink emulsion of the present invention is 4) a water-soluble resin. This resin serves a dual function. It is used as a film-forming binder for aiding in the fixing of the nigrosine dye colorant to the substrate that is to be printed. The resin is also used to enhance the stability of the ink emulsion by providing sufficient thickening action to the aqueous system. In this way, the resin keeps the nigrosine dye-containing oil droplets uniformly suspended and dispersed in the aqueous phase for extended times and prevents the settling of the dye droplets, thereby increasing the stability and pot life of the ink emulsion.

A wide variety of water-soluble resins can be used in the practice of this invention, including synthetic, semi-synthetic, and natural resin polymers. The resins used are preferably non-drying resins. The term "non-drying resins" refers to resins that form films only upon evaporation of the solvent, without oxidation, polymerization, or other molecular change taking place. These non-drying resins do not contain drying oils.

Examples of suitable water-soluble resins for use in the present invention, include, without limitation, cellulose derivatives, such as methyl cellulose, methyl hydroxyethyl cellulose, methyl hydroxypropyl cellulose, hydroxyethyl cellulose, hydroxypropyl cellulose, and carboxymethyl methyl cellulose, styrene polymers and copolymers, such as styrene-acrylic copolymers, polyvinyl polymers and copolymers, such as polyvinyl alcohol, polyvinyl pyrrolidone, and poly (n-vinyl-2-pyrrolidone) homopolymers, acrylic polymers and copolymers, polysaccharides, and like water-soluble resins. Of these water-soluble polymers, polyvinyl pyrrolidones, styrene-acrylics, and acrylics are especially preferred.

The components 1) to 4) are blended together in an effective amount to form a very fluid aqueous ink emulsion containing the finely divided nigrosine dye-containing oil droplets uniformly and stably dispersed in the aqueous stabilizing medium. Components 1) to 4) can be present in the ink emulsion in the preferred range: between about 1 and about 30 wt. %, preferably between about 10 and about 20 wt. %, of 1) a water-reducible nigrosine dye or mixture of water-reducible nigrosine dyes ; between about 25 and about 90 wt. %, preferably between about 50 and 85 wt. %, of 2) water; between about 0 and about 30 wt. %, preferably between about 0 and 15 wt. %, of 3) an additional co-solvent or mixture of co-solvents; and, between about 0.1 and about 45 wt. %, preferably between about 0.5 and about 20 wt. % of 4) an emulsion stabilizer comprising a water-soluble resin or mixture of water-soluble resins, based on the total weight of the ink emulsion. The aforesaid ranges are merely exemplary and other ranges will become apparent from the practice of the invention.

In accordance with the present invention, other common ink additives can be included in the ink emulsions, such as pH adjusters, rheology modifiers, antioxidants, thixotropic agents, plasticizers, conductive agents, such as salts, and the like.

In one exemplary method used to form the stable oil-in-water ink emulsion containing a water-immiscible nigrosine dye, the water-reducible nigrosine dye-containing solution component 1) is emulsified through the addition, under agitation, with the water component 2). This is followed by the addition of components 3) and 4) to the admixture under continued agitation. The water reducible dye solution is thus stably dispersed in an aqueous solution as fine droplet particles. The dispersion is properly agitated to homogeneously disperse the water-reducible nigrosine dye-containing oil droplets in the aqueous solution and produce a fluid and stable oil-in-water ink emulsion. Heating up to about 122° F. can be used to help disperse the dye droplets. The ink emulsion is finally filtered through a mesh screen or filter paper, preferably having between 1 and 5 μm pore size, to separate out any residual larger dye droplets from the desired smaller droplets. Other methods for forming the stable water-in-oil ink emulsion should be apparent from the aforesaid description and following examples.

The ink emulsions of the invention are readily printed onto porous substrates, especially paper, through ink-jet nozzles of drop-on-demand ink-jet printers as well as through the dispensing tips of felt-tip and roller-ball pens. Of course, non-porous substrates, for example, UV coated stock, acetate film, and the like, can be printed upon with the ink emulsion of the present invention given a proper amount of resin to allow for the necessary adhesion. The substrate to be printed upon is preferably porous, since the ink emulsions of the invention generally dry by absorption of the ink fluid into the pores of the substrate, to form a water-fast dry nigrosine dye film on the surface of the substrate. Drying can be accelerated by evaporation of the ink fluid. Examples of suitable printable porous substrates for the ink emulsions of the invention include, without limitation, paper, cardstock, corrugated cardboard, and the like.

It is desired that an ink emulsion thus produced has the final properties as identified in the Table below.

Final Ink Emulsion Properties

| Property | General Range | Preferred Range |
| --- | --- | --- |
| Viscosity (cP) | 3 to 15 | 3 to 8 |
| Dye Droplet Size (μm in dia) | 1 to 10 | <1 to 2 |
| pH | 5 to 9 | 6.5 to 8 |
| Drying Time In Air (min) | 1 to 3 | <1 |
| Resolubility Upon Itself | Good to Excellent | Excellent |
| Water-fastness | Good to Excellent | Excellent |
| Emulsion Stability (Shelf-Life) | At Least 1 Month | At Least 6 Months to 1 Year |

The invention will be further clarified by a consideration of the following non-limiting Examples, which are intended to be purely exemplary of the invention. Unless otherwise stated herein, the parts and percentages are by weight.

EXAMPLE 1

Aqueous Ink-Jet Ink Emulsion Based On Aquamate® Black 20149 Nigrosine Dye

The ingredients of the black ink-jet emulsion of Example 1 are listed in Table 1 below.

TABLE 1

| Ingredients | Parts By Weight |
| --- | --- |
| n-Propanol | 25.0 |
| Aquamate ® Black 20149 Water-Reducible Nigrosine Solution[1] = | 20.0 |
| C.I. Solvent Black 7 | 27.0 |

TABLE 1-continued

| Ingredients | Parts By Weight |
| --- | --- |
| Diethylene Glycol | 40.0 |
| Igepal ® CO-720[2] | 33.0 |
| Total | 100.0 |
| PVP Resin[3] | 25.0 |
| Water | 30.0 |
| Total | 100.00 |

[1]The Aquamate ® Black 20149 was prepared by dissolving the C.I. Solvent Black 7 in n-propanol. To this solution was added, with stirring, the diethylene glycol. Subsequently, with continued stirring, the nonylphenoxypoly (ethyleneoxy) ethanol non-ionic surfactant was added. The n-propanol was subsequently stripped at about 110° C. Morton International.
[2]Igepal ® CO-720 is a non-ionic surfactant of nonylphenoxypoly (ethyleneoxy) ethanol. CAS #9016-45-9. Rhone Poulenc.
[3]PVP Resin is a poly (vinylpyrrolidone) resin. GAF-ISP.

The black ink-jet emulsion was prepared by mixing together at room temperature the above-ingredients listed in Table 1 in the order given while slowly stirring with a magnetic stirrer. Stirring was continued for about 1 hour. The black ink emulsion was then filtered to have a dye droplet size of about 1 μm. The black ink emulsion had a pH of about 7, a viscosity of about 12 centipoise (cP) at 22° C., a drying time of less than about 1 minute, and a shelf life of at least about 1 month or greater. The ink emulsion was satisfactorily printed onto a paper substrate through an ink-jet printer, and the dried printed indicia had good resolution and good water-fastness.

EXAMPLE 2

Aqueous Ink-Jet Ink Emulsion Based On Aquamate® Black 20149 Nigrosine Dye

The ingredients of the black ink-jet emulsion of Example 2 are listed in Table 2 below.

TABLE 2

| Ingredients | Parts By Weight |
| --- | --- |
| Water | 84.5 |
| PVP Resin | 0.5 |
| Aquamate ® Black 20149 Water-Reducible Nigrosine Dye Solution | 15.0 |
| Total | 100.00 |

The black ink-jet emulsion was prepared by mixing together at room temperature the above-ingredients listed in Table 2 in the order given while slowly stirring with a magnetic stirrer. Stirring was continued for about 1 hour. The black ink emulsion was then filtered to have a dye droplet size of about 1 μm. The black ink was satisfactorily printed onto a paper substrate through an ink-jet printer.

EXAMPLE 3

Aqueous Felt-Tip Pen And Roller-Ball Pen Ink Emulsion Based On Aquamate® Black 20154 Nigrosine Dye The ingredients of the felt-tip pen or roller-ball pen black ink emulsion of Example 3 are listed in Table 3 below.

TABLE 3

| Ingredients | Parts By Weight |
| --- | --- |
| Water | 75.0 |
| PVP Resin | 1.0 |

TABLE 3-continued

| Ingredients | Parts By Weight |
| --- | --- |
| Aquamate ® Black 20154 Water- | 24.0 |
| Reducible Nigrosine Solution[1] = | |
| C.I. Solvent Black 7 | 27.0 |
| Diethylene Glycol | 20.0 |
| Methyl Lactate | 20.0 |
| Igepal ® CO-720 | 15.0 |
| Total | 100.0 |
| Total | 100.00 |

The black ink emulsion was prepared by mixing together at room temperature the above-ingredients listed in Table 3 in the order given while slowly stirring with a magnetic stirrer. Stirring was continued for about 1 hour. The black ink emulsion was then filtered to have a dye droplet size of about 1 µm. The black ink emulsion was satisfactorily dispensed from the ink reservoir out through the tip of a felt-tip pen and a roller-ball pen onto a paper substrate and the dried printed indicia had excellent water-fastness.

The invention having been disclosed in the foregoing embodiments and examples, other embodiments of the invention will be apparent to persons skilled in the art. The invention is not intended to be limited to the embodiments and examples disclosed, which are considered to be exemplary only. Accordingly, reference should be made to the appended claims to asses the true spirit and scope of the invention, in which exclusive rights are claimed.

The subject matter claimed is:

1. A stable aqueous ink emulsion based upon a water-insoluble nigrosine dye, which comprises:

between about 1 and about 30 wt. % based on said emulsion of a water-reducible nigrosine dye-containing solution, said water-reducible nigrosine dye-containing solution comprising:

between about 20 and about 50 wt. % based on said nigrosine dye-containing solution of at least one water-insoluble nigrosine dye;

between about 25 and about 50 wt. % based on said nigrosine dye-containing solution of a first solvent including at least one solvent having a flash point of at least about 141° F. (61° C.) and a boiling point of at least about 280° F. (138° C.); and, between about 20 and about 40 wt. % based on said nigrosine dye-containing solution of a non-ionic surfactant;

between about 25 and about 90 wt. % based on said emulsion of water;

between about 0 and about 30 wt. % based on said emulsion of at least one second solvent; and, between about 0.1 and about 45 wt. % based on said emulsion of an emulsion stabilizer comprising at least one water-soluble resin.

2. The ink emulsion of claim 1, in which said emulsion is an oil-in-water emulsion having said nigrosine dye-containing solution forming oil droplets dispersed in the aqueous phase.

3. The ink emulsion of claim 2, in which said emulsion is highly fluid having a viscosity of between about 3 and about 15 cP at ambient temperature.

4. The ink emulsion of claim 2, in which said emulsion forms finely divided nigrosine dye-containing oil droplets having an average particle size of between about 1 and 10 microns uniformly dispersed in the aqueous phase.

5. The ink emulsion of claim 2, in which said at least one water-soluble resin is selected from the group consisting of cellulosics, styrenes, polyvinyls, acrylics, styrene-acrylics, and polysaccharides.

6. The ink emulsion of claim 2, in which said at least one water-soluble resin is selected from the group consisting of vinyl pyrrolidone polymers, styrene-acrylic polymers, and acrylic polymers.

7. The ink emulsion of claim 2, in which said at least one solvent having a flash point of at least about 141° F. (61° C.) and a boiling point of at least about 280° F. (138° C.) in said first solvent is selected from the group consisting of diethylene glycol, triethylene glycol, tetraethylene glycol, propylene glycol, n-methyl-2-pyrrolidinone, and butyl lactate.

8. The ink emulsion of claim 2, in which said at least one solvent having a flash point of at least about 141° F. (61° C.) and a boiling point of at least about 280° F. (138° C.) in said first solvent comprises diethylene glycol.

9. The ink emulsion of claim 2, in which said non-ionic surfactant is selected from the group consisting of long chain fatty acid esters, polyoxyethylated nonylphenols, alkoxylated alkylphenols, coconut diethanolamides, and polyethoxylated castor oils.

10. The ink emulsion of claim 2, in which said non-ionic surfactant comprises nonyl-phenoxypoly (ethyleneoxy) ethanol.

11. An ink-jet printer which contains said ink emulsion of claim 2.

12. A felt-tip pen which contains said ink emulsion of claim 2.

13. A roller-ball pen ink which contains said ink emulsion of claim 2.

14. A stable aqueous oil-in-water ink emulsion, which comprises:

a water-reducible, water-insoluble nigrosine dye-containing solution including a water-insoluble nigrosine dye, an effective amount of an solvent containing a solvent having a flash point of at least about 141° F. (61° C.) and a boiling point of at least about 280° F. (138° C.) to dissolve said dye, and an effective amount of a non-ionic surfactant to create a water-in-oil emulsion upon the addition of water;

water in an effective amount to effect emulsification; and, a water-soluble resin in an effective amount to sufficiently maintain finely divided droplets of said dye-containing solution uniformly dispersed in the aqueous phase.

15. A method for forming water-fast indicia on a porous substrate with a stable aqueous ink emulsion based upon a water-insoluble nigrosine dye, which comprises: providing a porous substrate to be printed upon; providing a substantially stable, fluid, and water-fast aqueous ink emulsion comprising:

between about 1 and about 30 wt. % based on said emulsion of a water-reducible nigrosine dye-containing solution, said water-reducible nigrosine dye-containing solution comprising:

between about 20 and about 50 wt. % based on said nigrosine dye-containing solution of at least one water-insoluble nigrosine dye;

between about 25 and about 50 wt. % based on said nigrosine dye-containing solution of a first solvent including at least one solvent having a flash point of at least about 141° F. (61° C.) and a boiling point of at least about 280° F. (138° C.); and, between about 20 and about 40 wt. % based on said nigrosine dye-containing solution of a non-ionic surfactant;

between about 25 and about 90 wt. % based on said emulsion of water;

between about 0 and about 30 wt. % based on said emulsion of at least one second solvent; and, between about 0.1 and about 45 wt. % based on said emulsion of an emulsion stabilizer comprising at least one water-soluble resin; and, ejecting said ink emulsion in a pattern from an ink reservoir containing said ink emulsion through a dispenser of a printing instrument onto said porous substrate to form printed indicia thereon; and, allowing said printed indicia to dry and fix on said substrate.

16. The method of claim 15, in which said printing instrument is an ink-jet printer.

17. The method of claim 15, in which said printing instrument is a roller-ball pen.

18. The method of claim 15, in which said printing instrument is a felt-tip pen.

* * * * *

UNITED STATES PATENT AND TRADEMARK OFFICE
CERTIFICATE OF CORRECTION

PATENT NO. : 5,746,815
DATED : May 5, 1998
INVENTOR(S) : Caputo

It is certified that error appears in the above-indentified patent and that said Letters Patent is hereby corrected as shown below:

Col. 5, Ln. 55    change "between about" to read -- between about 20 --.

Signed and Sealed this

Fifteenth Day of June, 1999

Attest:

Q. TODD DICKINSON

*Attesting Officer*    *Acting Commissioner of Patents and Trademarks*